United States Patent Office 2,701,476
Patented Feb. 8, 1955

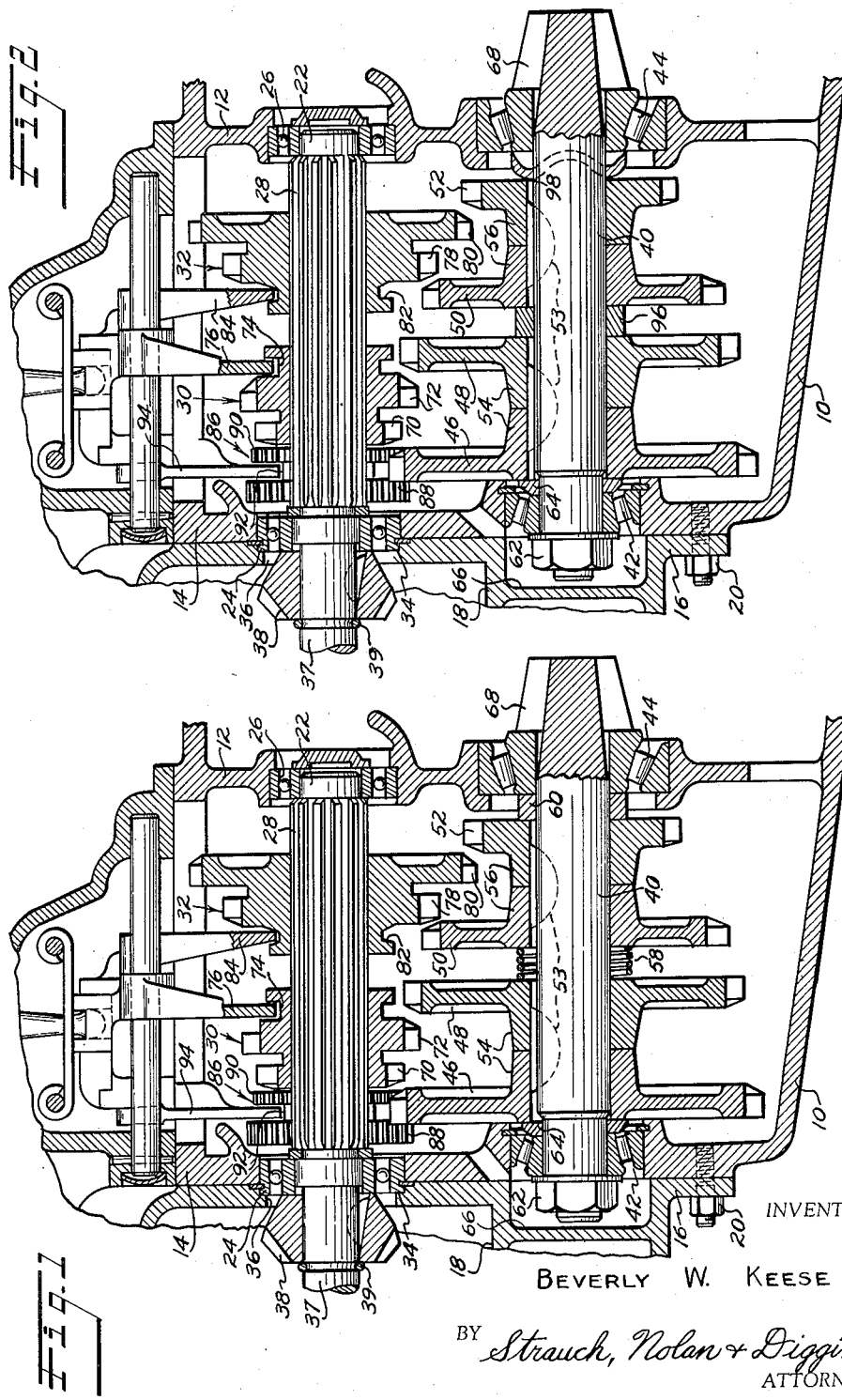

2,701,476

TRANSMISSION

Beverly W. Keese, Oshkosh, Wis., assignor, by mesne assignments, to Rockwell Spring and Axle Company, Coraopolis, Pa., a corporation of Pennsylvania Application November 17, 1950, Serial No. 196,236

9 Claims. (Cl. 74—342)

This invention relates to improvements in variable speed transmission mechanisms for engine driven vehicles and is a continuation in part of my copending application Serial No. 524,600 for Motor Vehicle Driving Mechanism, now United States Letters Patent No. 2,537,060, issued January 9, 1951, and of copending application Serial No. 767,230, for Power Take-off Mechanism of B. W. Keese et al.

It is the primary object of this invention to provide a novel means for adjusting the bearings of the output shaft of a transmission unit.

It is a further object of this invention to provide an improved transmission having means for adjusting the output shaft bearings and holding the bearings in their adjusted position.

More specifically, it is an object of this invention to provide a resilient spacer coacting with the bearing adjusting means to maintain the correct position of the change speed gears and the bearings of the output shaft and to compensate for size variations of the gears.

Other objects will become apparent as the description proceeds in connection with the accompanying drawings wherein like parts have been designated by the same reference numeral and wherein:

Figure 1 is a vertical sectional view of a transmission constituting the first embodiment of this invention, and Figure 2 is a vertical sectional view of a modified transmission constituting the second embodiment of this invention.

Referring now to the drawings and to Figure 1 in particular wherein the preferred embodiment of this invention is shown, an improved variable speed transmission unit is disclosed.

As disclosed in the aforesaid copending applications, the transmission unit is mounted within the forward compartment of a one piece casting 10 having a vertical dividing wall 12 separating the transmission unit from the differential and final drive gearing of the vehicle.

The front wall 14 of the housing structure 10 is adapted to be secured to the rear end wall flange 16 of a clutch and power take-off housing structure 18 by suitable means such as bolts, one of which is designated as 20.

A power input shaft 22 of the transmission unit is rotatably supported at its ends by conventional anti-friction bearings 24 and 26 mounted in the walls 14 and 12 of housing 10. The input shaft 22 is formed with longitudinally extending peripheral splines 28 to coact with the complementary internal splines of the speed selector gear clutches 30 and 32, respectively, whereby the latter have unitary rotation with said shaft while being freely shiftable axially thereof, as will be presently explained. The bearing 24 abuts an annular shoulder 34 in the rear wall of the clutch housing structure 18 and closes an opening 36 therein through which the front end section 37 of the input shaft 22 extends. Shaft 22 is releasably coupled by means not shown to a prime mover power shaft. The opening 36 accommodates the end of a bevel driving pinion 38 which is keyed or otherwise fixed to the shaft section 37 and held on abutting engagement with the inner race ring of bearing 24 by a snap ring 39 seated in an annular groove in said shaft at the opposite end of said pinion. As is shown in the aforesaid copending applications, pinion 38 is the driving pinion for a power take-off shaft.

Below and slightly to one side of a vertical plane which includes the axis of the input shaft 22, the power output shaft 40 of the transmission is journalled at its opposite ends within tapered roller bearings 42 and 44 which are mounted in walls 14 and 12 respectively of housing 10. The axis of said output shaft 40 is substantially coincident with the longitudinal center line of the vehicle. Between said bearings, the change speed gears 46, 48, 50, and 52 are non-rotatably mounted on shaft 40 by any suitable means such as by keys 53, said gears transmitting first, second, third and fourth driving speeds, respectively, to the power output shaft 40 from the input shaft 22. Reverse rotation is also transmitted to said output shaft through the gear 46 in the manner to be presently explained. Preferably these gears are arranged in pairs, the gears in each pair having hub portions 54 and 56, respectively, laterally extending on one side of the plane of the respective gears for abutting contact with each other. Thus, the engaged hubs 54 of the first and second speed gears 46 and 48 prevent movement of said gears toward each other while the engaged hubs 56 of the third and fourth speed gears 50 and 52 serve a similar purpose with respect to the latter gears. The two pairs of gears are resiliently held in longitudinally spaced apart relation on the output shaft 40 by a coil type compression spring 58, surrounding said shaft between and in abutting contact with the hubs of the second and third speed gears 48 and 50, respectively. A spacing collar 60 is mounted surrounding shaft 40 between and in abutting contact with gear 52 and the inner race of bearing 44. Spring 58 serves the double purpose of an automatic adjusting means for the bearings and also of a resilient means to resist any tendency of the driven change-speed gears to move longitudinally in one direction along the output shaft 40.

At its forward end the output shaft 40 has a reduced threaded portion to receive an adjusting nut 62 for the bearing. Between the inner side of bearing 42 and the hub of gear 46, a spacing washer 64 is interposed. The adjusting nut 62, which when operated finally adjusts the bearings 42 and 44 at the ends of the output shaft 40, is received in the recess of cavity 66 in the rear end wall of the housing structure 18 when the housing 10 is assembled therewith. The inner race ring of bearing 44 is engaged by one end of the bevel pinion 68 which is formed integrally with the rear end of output shaft 40. Pinion 68 drives the differential mechanism in the conventional manner as is described in detail in the aforesaid applications.

The gear cluster 30 on the transmission input shaft 22 includes the integrally formed first and second speed gears 70 and 72, respectively, and grooved collar 74 receiving the arms of the shifting fork 76 by which the cluster 30 is shifted along the input shaft 22 to selectively mesh gears 70 and 72 thereof with gears 46 or 48 respectively which are mounted on the output shaft 40. The other gear cluster 32 includes the integrally formed gears 78 and 80 and grooved collar 82 which receives the arms of shifting fork 84 by which the gear cluster is shifted to selectively mesh the gears 78 and 80 thereof with the gears 50 and 52 respectively which are mounted on the output shaft 40.

At one side of the input shaft 22 and slightly above the axis thereof a relatively short idler shaft (not shown) is suitably fixed at one end in the front end wall 14 of the transmission housing 10 and at its other end in a bracket lug (not shown) formed on a side wall of said compartment. On this shaft the reverse gear cluster 86 is slidably and rotatably mounted. This cluster includes the integrally formed gear elements 88 and 90 respectively, and between said elements the annular groove 92 is formed to receive the arms of the shifting fork 94. Reverse rotation is transmitted to the output shaft 40 in the usual manner by shifting the gear cluster in one direction on its shaft from its normal idle position to mesh the gears 88 and 90 thereof with gear 46 on the output shaft 40 and gear 70 on the input shaft 22, respectively. Reference is made to application Serial Number 524,600 aforesaid for further details of this structure.

A modification of the transmission unit improvement is disclosed in Figure 2. This modification differs from that previously discussed in detail in reference to Figure 1 in that coil spring 58 of the embodiment shown in Figure 1 has been replaced by a spacing collar 96 in the modification of Figure 2, and in that spacing collar 60 of the embodiment shown in Figure 1 has been replaced by an annular wave type spring member 98. In all other respects the structure of the two embodiments is identical.

According to this invention a transmission unit for vehicles of an improved construction which facilitates the adjustment of the bearings of the transmission output shaft has been devised. This improved construction facilitates this adjustment in several ways.

Spring 58 of the first embodiment and spring 98 of the second embodiment of this invention both provide a resilient spacing member which permits adjustment of the tapered roller bearings for optimum operating conditions while maintaining the proper axial positions of the gears 46, 48, 50, and 52 along shaft 40 by limiting axial movement thereof to that produced by the adjustment. These springs 58 and 98 by tending to expand, force the inner race rings of bearing 42 and 44 against nut 62 and pinion 68 as stops to maintain the correct adjusted position of the inner race rings. Springs 58 and 98 serve further as resilient spacers to compensate for any variation in the lengths of the gear hubs and thus permit accurate adjustment of the bearings.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patnet is:

1. Transmission mechanism for motor vehicles comprising power input and output shafts, speed selector gears non-rotatably mounted for axial movement on the input shaft, change speed gears keyed on the output shaft, means for shifting the selector gears into and out of driving engagement with the selected change speed gears, and means yieldingly resisting axial movement of the change speed gears along the output shaft.

2. The transmission mechanism defined in claim 1, wherein said last named means is a resilient spacer.

3. The transmission mechanism defined in claim 2, wherein said resilient spacer is a compression spring of the coil type, mounted on said output shaft and interposed between a pair of said change speed gears.

4. Transmission mechanism for motor vehicles comprising, in combination with a housing structure, power input and output shafts, anti-friction bearing assemblies for said shafts mounted in spaced walls of the housing structure, speed selector gears non-rotatably mounted for axial movement on the input shaft, change speed gears non-rotatably mounted on the output shaft, means for shifting the selected change speed gears, adjusting means for one of the output shaft bearings, and a resilient spacer disposed on said output shaft intermediate said output shaft bearings and coacting with said adjusting means to yieldingly resist axial movement of the change speed gears along said output shaft.

5. In a transmission unit, a housing, an input shaft journalled therein, an output shaft, speed selector gears non-rotatably mounted for axial movement along said input shaft, change speed gears non-rotatably mounted on said output shaft, means for shifting said selector gears into and out of driving engagement with the selected change speed gears, a pair of oppositely facing tapered roller bearings journalling said output shaft in said housing, and means for adjusting said bearings comprising adjustable means for limiting the axial movement of the inner bearing races and resilient means urging the inner races of said bearings against said axial movement limiting means.

6. In a transmission unit, a housing, an input shaft journalled therein, an output shaft, axially adjustable anti-friction bearings journalling said output shaft in said housing, speed selector gears non-rotatably mounted for axial movement along said input shaft; change speed gears non-rotatably mounted on said output shaft, means for shifting said selector gears into and out of driving engagement with the selected change speed gears, means for axially adjusting said anti-friction bearings in one direction, and resilient spacer means yieldingly resisting said adjusting means to maintain the adjusted position of said bearings.

7. The transmission unit as defined in claim 6 wherein said adjustable anti-friction bearings are tapered roller bearings.

8. In a transmission unit, housing structure, a shaft, axially adjustable anti-friction bearings journalling said shaft in said housing structure, means for adjusting at least one of said bearings axially of said shaft, and resilient means intermediate said bearings and coacting with said adjusting means for maintaining said bearing in its adjusted position.

9. In a transmission unit, a power output shaft assembly journalled in a pair of spaced oppositely facing tapered roller bearings fixed within a transmission housing and comprising a fixed abutment at one end of said shaft assembly external of and in engagement with the inner race of one of said bearings and an axially adjustable abutment external of and in engagement with the inner race of the other of said bearings, a change speed gear non-rotatably mounted on said power output shaft intermediate said bearings, means defining rigid annular spacer means surrounding said shaft intermediate said bearings and including said change speed gear, and resilient spacer means surrounding said shaft intermediate said bearings and in abutting engagement with said rigid spacer means, said resilient and rigid spacer means coacting to resiliently hold the inner races of said bearings against said fixed and adjustable abutment.

References Cited in the file of this patent

UNITED STATES PATENTS

| | | |
|---|---|---|
| 1,143,044 | Fuchs | June 15, 1915 |
| 1,193,419 | Pierce | Aug. 1, 1916 |
| 1,198,869 | Pierce | Sept. 19, 1916 |
| 1,344,319 | Stevens | June 22, 1920 |
| 1,517,060 | Hanson | Nov. 4, 1924 |
| 1,518,413 | Ross | Dec. 9, 1924 |
| 2,245,078 | Padgett | June 10, 1941 |
| 2,338,413 | De Falco | Jan. 4, 1944 |
| 2,506,670 | Kamlukin | May 9, 1950 |